US008041365B1

(12) United States Patent
Gentle et al.

(10) Patent No.: US 8,041,365 B1
(45) Date of Patent: Oct. 18, 2011

(54) LOCATION-BASED SURVEY VIA MOBILE DEVICE

(75) Inventors: Christopher R. Gentle, Gladesville (AU); Julian James Orbach, Macquarie Park (AU); Alastair J. Rankine, Annandale (AU)

(73) Assignee: Avaya Inc., Basking Ridge, NJ (US)

( * ) Notice: Subject to any disclaimer, the term of this patent is extended or adjusted under 35 U.S.C. 154(b) by 1481 days.

(21) Appl. No.: 11/243,751

(22) Filed: Oct. 4, 2005

(51) Int. Cl.
*H04W 64/00* (2009.01)
*H04M 3/00* (2006.01)
(52) U.S. Cl. ........... 455/456.1; 379/265.01; 379/265.02; 455/456.2
(58) Field of Classification Search ............ 379/265.01, 379/265.02; 455/456.1–457
See application file for complete search history.

(56) References Cited

U.S. PATENT DOCUMENTS

| 7,181,225 | B1 * | 2/2007 | Moton et al. | 455/456.1 |
| 2003/0087648 | A1 * | 5/2003 | Mezhvinsky et al. | 455/456 |
| 2006/0262920 | A1 * | 11/2006 | Conway et al. | 379/265.02 |
| 2007/0024450 | A1 * | 2/2007 | Shichiku et al. | 340/573.1 |
| 2008/0221925 | A1 * | 9/2008 | Jones | 705/2 |

OTHER PUBLICATIONS

Various website pages from http://www.answers.google.com/answers/faq.html; printed Jul. 29, 2005.
Various website pages from http://www.mojoknows.com.au/mojo/welcome.do;jsessionid=96329128901577EB534341B...; printed Jun. 7, 2005.
Various website pages from http://sp.ask.com/docs/about/index.html; printed Sep. 16, 2005.

* cited by examiner

*Primary Examiner* — Rasha Al Aubaidi
(74) *Attorney, Agent, or Firm* — Sheridan Ross P.C.

(57) ABSTRACT

A system and method are provided for obtaining information on inquiries related to location dependent facts utilizing mobile networked communication devices and preselected respondents who obtain information on the requested facts. The system includes a call center comprising a communication server and one or more work stations manned by call center agents. A plurality of respondents act as information gatherers to find answers to inquiries forwarded to the respondents by the call center. Customers first contact the call center, and inquiries are parsed for location and subject matter. The inquiry is then allocated to a qualified respondent within the area of the location of interest. The respondent gathers information necessary to answer the inquiry and forwards the answer to the call center, preferably by use of the mobile networked communication device carried by the respondent. Respondents log in to the system indicating availability for servicing inquiries. Location tracking is provided so that the call center is aware of the locations of respondents. Global position satellite techniques as well as phone triangulation techniques may be used to track the respondents' locations.

25 Claims, 2 Drawing Sheets

LOCATION-BASED SURVEY VIA MOBILE DEVICE

FIELD OF THE INVENTION

The present invention is directed generally to obtaining information on a location dependent fact, and more particularly, to a system and method for obtaining information on inquiries related to location dependent facts utilizing mobile communication devices and preselected respondents who obtain information on the requested facts.

BACKGROUND OF THE INVENTION

With the advent of the Internet, there are many online services that enable one to conduct a search to obtain answers to factual questions. These services are provided through what are commonly referred to as Internet search engines. The search engines allow a user to enter a search request, and the search engine will produce a search list that may include a number of websites or Internet publications containing the key word(s) searched. Various levels of sophistication exist for Internet search engines that enable a user to more readily obtain information concerning a specific fact. One of the more popular search engines includes Google®. There are a number of different types of searches that may be conducted on the Google® search engine. For example, one search offered by Google® allows a user to search for particular products or services within particular geographic areas. For example, a person can search for restaurants in a particular geographic area. Another search offered by Google® is Google® Answers. For this search, a user enters a question to be answered, along with a price bid for answering the question. Screened researchers are available to answer the question. Price bids that are set too low may result in a question not being answered. The researchers are screened and approved independent contractors who are paid by the Google® support service for posting answers to the questions. Registered users of the search service can ask questions and post comments to the site, but they are not allowed to post answers. The answers provided can be rated by the customers, and follow-up questions may be asked also on a price basis.

In addition to standard Internet search engines, there are enhanced search services that may be used in order to obtain information about facts that may be less well known. One enhanced search service includes Mojo Knows™. This particular service utilizes the Google® search engine, as well as other information sources enabling a user of the service to obtain an answer to a specific question. The user simply forwards the question to the Mojo Knows™ service, preferably by a mobile communication device, and then Mojo Knows™ responds to the customer's inquiry utilizing Google® and other information sources.

In the known Internet search engines as well as the enhanced search services, the information obtained about the fact in question is location independent. In other words, the question of fact that must be answered is a question that can be answered without a person having to be physically present at a particular location. For example, in the Google® search mentioned above, a customer requesting information about restaurants in a particular geographic area does not require a Google® representative to actually visit restaurants in the geographical area at that time; rather, a listing of restaurants in the particular area is information which is available through other sources such as a telephone listing.

There are many questions of fact that are location dependent and require a person to be physically located at the particular location in order to answer the question of fact. For example, if a person wished to know about available parking for an event such as a concert or sporting event and the person wished to know the parking status at a particular time just before the start of the event, a person located in the parking area of the concert is best qualified to provide a report on the parking status at that time. The Google® search engine is unable to provide information regarding such a location and time dependent fact.

There are many other types of location dependent facts that cannot be answered by an Internet search engine, or other Internet-based search services. Further for example, someone may wish to obtain information on the status of their home, and the status requires observation of the home at that time to answer the fact, such as whether the homeowner inadvertently left a fence gate open enabling a pet to roam, or whether the homeowner remembered to turn off a sprinkler/irrigation system.

Therefore, there is a need for an information service that can provide the customer of the service real time information on location dependent facts. These and other needs are addressed by the various embodiments of the present invention.

SUMMARY OF THE INVENTION

The present invention is directed generally to a method and system for obtaining and transferring information to a customer/user of the system regarding location dependent facts that the customer requests to be answered. These location dependent facts may be time sensitive in nature.

In a first embodiment of the present invention, the system includes a call or contact center that manages incoming requests from customers regarding location dependent facts, and the call center coordinates obtaining information to answer the inquiries initiated by customers. The customers provide a payment in return for receiving an answer to the location dependent factual inquiry. One or more pre-designated respondents act as information gatherers who receive the information requests from the call center, and then based primarily upon their location at the time, the respondent(s) investigating the inquiry then provides answers to the questions.

Preferably, the respondents of the system carry mobile networked devices, such as mobile phones, personal digital assistants (PDAs), or other communication devices. The respondents maintain communication with the call/contact center, and receive the inquiries through the call/contact center. Additionally, the system maintains some capability for the call/contact center to determine the location of the respondent. This capability can be achieved through, for example, a global positioning device integrated within the mobile networked device, or through phone signal triangulation wherein the call/contact center is able to estimate the locations of the respondents by known triangulation techniques. Respondents of the system are therefore tracked as to their specific location so that questions received from customers can be routed to the respondent(s) who is most closely located in the area where the answer must be obtained.

The inquiry or inquiries are forwarded to the appropriate respondent(s), preferably through the call/contact center, in the form of a text message, email, or an outgoing interactive voice response (IVR) call generated by an IVR unit in the call center. Once the question is received by the respondent, the respondent has the option of servicing the question by signaling acceptance. The acceptance could be a simple and short yes/no answer in the form of an email, text message, or a response to the outgoing IVR call that requests the respondent signal acceptance/denial at the time of receiving the question. If the respondent chooses to answer the inquiry, the respondent conducts the necessary investigation and then sends an answer back to the call center, such as a voice message, text message, or email. The answer could also include a photograph or audio recording taken at the location of interest. While this answer is preferably routed back through the call center and then to the customer, the respondent may have the authority to send the answer directly to the customer if the customer chooses to allow the direct response.

Upon receiving the answer to the inquiry, the customer may have a follow-up inquiry in which case the follow-up inquiry is preferably routed again to the call/contact center, and then forwarded to the respondent. Once the customer's final inquiry has been answered satisfactorily, the customer has the option of rating the value, speed, and accuracy of the response(s). This rating may be used to affect the price charged to the customer, as well as the amount of the compensation given to the respondent for servicing the inquiry(ies).

In another embodiment of the method and system of the present invention, a customer may be given authorization to directly contact one or more pre-registered respondents who then communicate directly with the customer to answer the customer's location dependent inquiries. In this embodiment, the call/contact center may first provide the customer with a set or subset of potential respondents who are available to answer the inquiry based upon the particular location of the respondents, as well as their qualifications in answering the type of question asked. The customer in this embodiment would still initially contact the call/contact center, but then would receive authorization to directly contact and communicate with the respondent. Once the customer's inquiry has been satisfactorily answered by the one or more respondents, the respondent(s) would be responsible for reporting back to the call center as to the services provided, to include the number of questions answered in order that the call/contact center can determine a price structure for charging the customer. As with the first embodiment, a customer would also then have the option of rating the value, speed and accuracy of the responses provided by the respondent(s).

Other advantages and features of the present invention will become apparent from a review of the figures, taken in conjunction with the detailed description.

DETAILED DESCRIPTION

Figure 1:
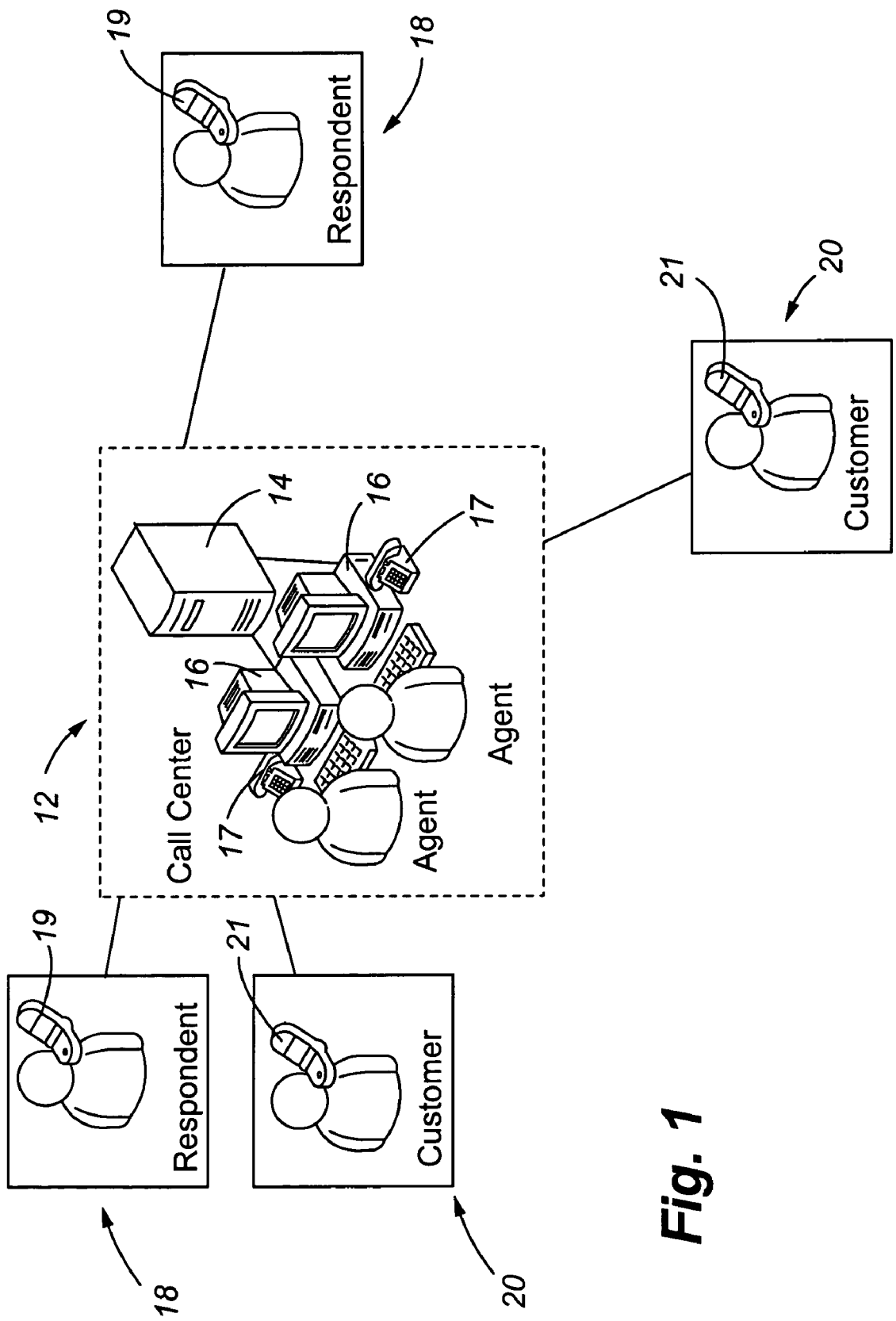
FIG. 1 is a schematic diagram depicting the system of the present invention.

Referring to FIG. 1, a schematic diagram is provided showing the system of the present invention. The system includes a call or contact center 12 which comprises a gateway or communications server 14, one or more work stations 16 used by agents who service incoming calls/inquires, and one or more communication devices 17 such as telephones. The work stations and the communication server include computer software which facilitates receipt, screening, and prioritizing of customer inquiries. The computer software also provides a protocol for disseminating the inquiries to available and qualified respondents.

The system further includes one or more respondents 18 who carry their own mobile networked communication devices 19, such as cellular phones, PDA's, or other digital electronic communication devices. The respondents 18 maintain communication with the call center. For respondents who wish to be available for servicing customer inquiries, each respondent would log in to the service, that is, the respondent would send a communication to the call center indicating that the respondent was available for servicing inquires. After logging in, the respondent is tracked as to the location of the respondent. This tracking may be achieved by global positioning devices integrated within the communication devices 19, or separate global positioning devices (not shown) may be carried by the respondents. Yet another method by which respondent locations may be tracked would be by known triangulation methods.

Customers 20 contact the call center and communicate one or more inquires regarding location dependent facts. Preferably, the customer has its own communication device 21 and would dial a telephone number to be connected to the interactive voice response unit integrated within the call center. The interactive voice response unit is an automated telephone information system that communicates with the customer with a combination of fixed voice menus wherein the customer responds by pressing digits on the telephone or speaking words or short phrases to activate the voice response unit. For example, the interactive voice response unit could ask the customer as to the nature of the inquiry, the location of the inquiry, so that the nature/type of question as well as the location where the fact must be obtained is recorded in a database of the call center. Additionally, the customer's priority would be obtained, that is, the urgency in which the customer required an answer to be provided. Once the customer's inquiry was received, screened, and prioritized, the inquiry would be disseminated to one or more respondents who were logged in the system. The dissemination of the inquiry would include the necessary information for the respondent(s) to answer the inquiry, and would minimally include details on the nature of the inquiry as well as the location where the inquiry pertains.

If the inquiry was disseminated to more than one respondent, the call center could determine which respondent is ultimately authorized to service the inquiry. For example, if a particular inquiry was forwarded by the call center to more than one respondent and more than one of the respondents accepted the inquiry, the call center could allocate servicing of the inquiry based on which respondent was most qualified to answer the particular inquiry according to information stored in the system database concerning qualifications of the respondents. Alternatively, the call center could allocate authorization to service the inquiry based upon the first respondent to accept the inquiry. In many circumstances, it may be desirable to forward inquiries to more than one respondent to ensure that the inquiry can in fact be serviced in a timely manner without having to sequentially contact individual respondents, which presumably would take more time in ultimately servicing the inquiry. For those inquiries that do not have a time sensitive deadline, the call center may choose to disseminate the inquiry to a single respondent, and then contact another respondent if the first respondent does not accept the inquiry.

Figure 2:
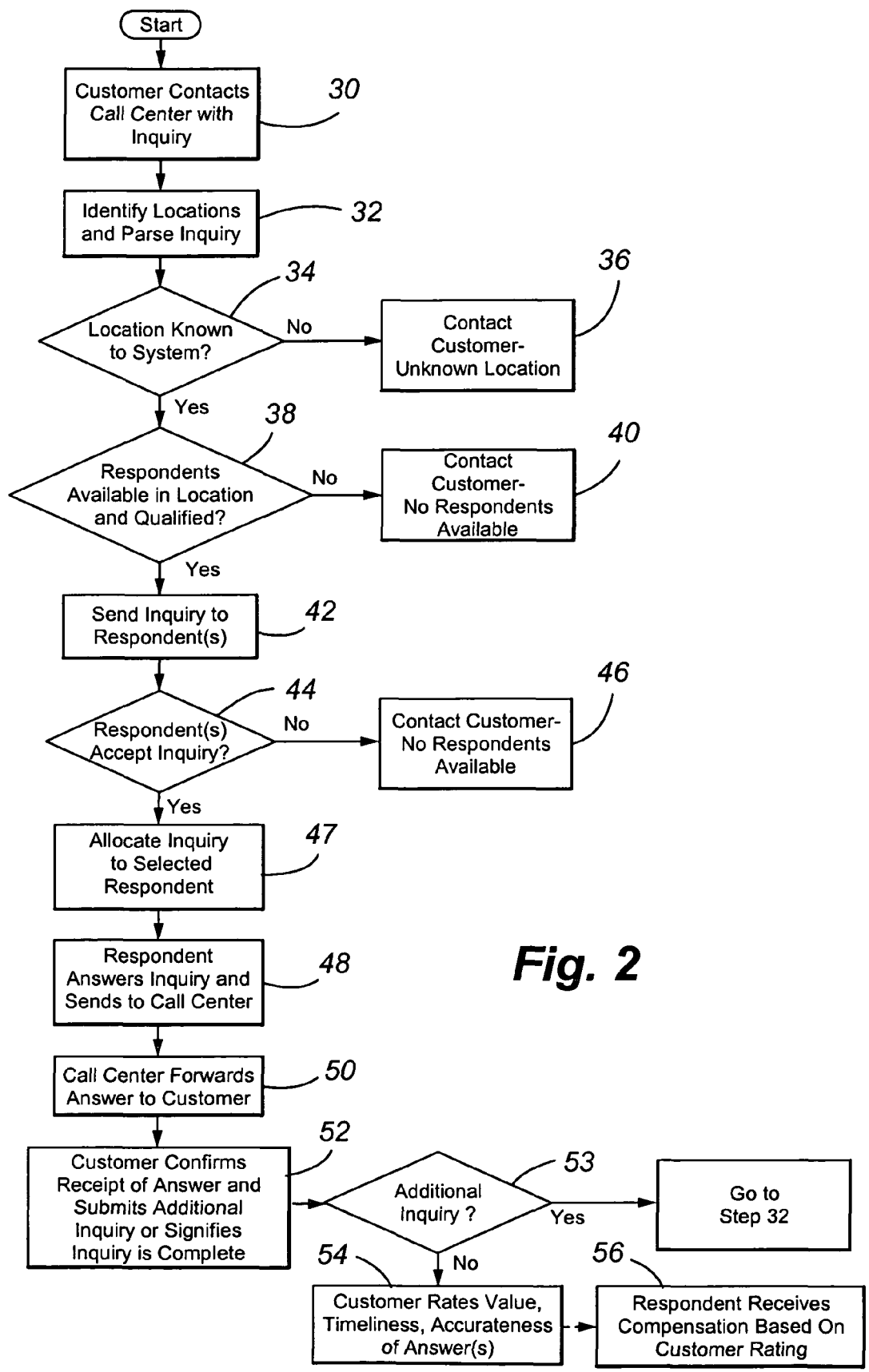
FIG. 2 is a block diagram illustrating the basic steps in the method of the present invention.

Referring now to FIG. 2, a flow diagram is provided that further details the steps in the method of the present invention, and also provides further information on the system of the present invention.

At block 30, the customer contacts the call center with the particular inquiry/question. At block 32, the call center identifies the location(s) where the inquiry pertains, and "parses" the inquiry to categorize the nature of the inquiry. For example, the inquiry could be parsed as to the general subject matter such as personal, scientific, entertainment related, etc. Once the question was classified in terms of location and subject matter, at step 34, the system database compares the location(s) to known locations. The inquiries can only be serviced if the customer's inquiry corresponded to a geographical location that was known by the system and available for servicing. For example, if the system only serviced a particular city or region, the system could not answer a question regarding a remote city or geographical area not within the service area. If the location was not known to the system at block 36, the customer would be immediately contacted by the call center and informed that the location was unknown and therefore, the inquiry could not be serviced. Alternatively, if there were other available systems in other geographical areas, the customer's call could be automatically forwarded to another call center that did service the location.

Assuming the location was known to the system, at block 38, the call center would determine whether respondents were available in the area of interest and whether the respondents were qualified to answer the question. At this step, the call center compares the location(s) of logged in respondents to determine whether respondents were available to timely service the question. For example, if the inquiry requested information specific about a particular location within a city and a respondent was located within ten minutes travel to the particular location, then assuming the required response time was more than ten minutes, the system would allocate the inquiry to the respondent, as shown at step 42. If there were no respondents available to answer the inquiry within the specified time, then as shown at step 40, the customer would be contacted and informed that no respondents were available to answer the inquiry at that time. In terms of respondent qualifications to answer a particular inquiry, it is also contemplated within the present invention that the customer could generally determine the skill level or expertise required to answer the inquiry. For most location dependent facts, it can be assumed that no particular expertise is required of a respondent; however, some inquiries may require a respondent to have special expertise.

As shown at block 212, one or more respondents receive a message sent from the call center detailing the nature of the question and the location of interest. At that time, as shown at block 44, the respondent(s) would either accept the inquiry, or reject the inquiry. As mentioned above, the message sent from the call center could be an email, text message, telephone call from an agent at the call center, or an outgoing IVR call. If the respondent(s) rejects the inquiry as shown at step 46, the customer is contacted and informed that no respondents are available to answer the inquiry. If more than one respondent accepted the inquiry, then at block 47, the call center allocates the inquiry to a single respondent based on location, qualifications, first to accept, or any other parameter set by the call center. At block 48, the selected respondent then takes the necessary steps to answer the inquiry. For example, the respondent may have to travel to the particular location, speak to other people in the area regarding the particular inquiry, or take other actions to completely answer the inquiry. The respondent's answer could be in many forms to include a text message, a voice mail message, and others. Additionally, the respondent's answer could include photographs, videos, audio, or other data necessary to fully respond to the inquiry. At step 50, the call center then forwards the answer to the customer. The call center forwards the answer to the customer by the mode requested by the customer, such as a voice mail message, a text message, email, etc. At step 52, the customer confirms receipt of the answer and submits an additional inquiry or signifies that the inquiry is complete. The customer's confirmation of receipt of the answer could also be completed in a number of different ways to include a telephone communication with the call center, text message, email, etc. As shown at step 53, if there is an additional inquiry, the additional inquiry is handled like the first inquiry by evaluating the inquiry by locations and parsing the subject matter at step 32. If the additional inquiry relates to the same geographical area/location that was the subject of the first inquiry, the additional inquiry is preferably allocated to the same respondent.

In order to track the efficiency of the system as well as to determine compensation for the respondents, the customer could be asked to rate the value, timeliness, and accuracy of the answers provided, as shown at step 54. This feedback from the customer could be achieved immediately after the customer signals the inquiry is complete, and this rating could also be sent back to the call center in a number of ways to include voice mail, text message, email, etc.

As shown at step 56, an optional additional step in the present method is to determine the respondent's compensation based upon the customer rating.

In another embodiment of the method of the present invention, it is contemplated that the respondent answering an inquiry may be given authorization to directly contact the customer. In this embodiment, the actual interface between the respondent and the customer may further facilitate more timely answering of additional questions by the customer, and may reduce the amount of time necessary to answer inquiries since the call center is not involved in forwarding the answer from the respondent. If the respondent directly contacts the customer, the respondent then sends a communication to the call center indicating that servicing of the answer was complete, and describes the services provided by the respondent in order that customer billing could be generated. As with the first embodiment, the customer could then rate the value, timeliness and accuracy of the answer(s) provided by the respondent. Additionally, if a customer liked the answers provided by a particular respondent, the customer could be given the option to directly contact that respondent in the future.

The database of the call center can maintain information over time regarding the reliability of the respondents, the expertise of the respondents, the location(s) where the respondents spend most of their time and thus have particular expertise, as well as many other factors that would best allow the call center to direct inquires to selected respondents.

In another aspect of the invention, a bidding feature can be incorporated wherein a customer requests an answer to an inquiry, and the customer would set a price or price range for which the customer was willing to pay for the answer. This bidding price or range would be quoted to the call center in the customer's inquiry, and the logged in respondents would have an opportunity to bid for their cost to answer the inquiry. The call center could then maximize profits by matching the customer's inquiry with the lowest bid by the available respondents. Other factors can be included in the call center's determination of which respondent should answer the bidded inquiry, for example, confirming that the lowest bidding respondent was qualified to answer the inquiry, was located at the correct geographical location in order to timely answer the inquiry, etc.

In yet another aspect of the present invention, the call center could set prices for answers to inquiries, such as flat rates for various types of inquiries. Additionally, the method and system of the present invention could be administered on a subscription basis wherein customers could subscribe to the service in a very similar way to existing mobile phone subscriptions, wherein a subscriber would be entitled to receive answers to a preset number of inquires.

The particular embodiments described above are intended to explain the best mode presently known in practicing the invention and to enable others skilled in the art to utilize the invention in such or in other embodiments and with various modifications required by their particular application or use of the invention. Therefore, it is intended that the appended claims be construed to include the alternative embodiments to the extent permitted by the prior art.

We claim:

1. A system for servicing inquiries regarding a location dependent fact, said system comprising:
   a contact center including means for receiving a customer inquiry, and means for categorizing the inquiry into one or more preconfigured categories, the preconfigured categories including location and subject matter, and disseminating the inquiry to at least a selected one of a plurality of respondents;
   a plurality of mobile networked communication devices communicating with said contact center, said communication devices usable for receiving the inquiry and for answering the inquiry, the respondents carrying said communication devices;
   means for identifying locations of the respondents to said contact center;
   means for identifying a location that is a basis of the inquiry;
   means for correlating the location associated with the inquiry to the identified locations of the respondents; and
   means for selecting at least one most closely located respondent, based on the correlation, to answer the inquiry, thus providing the location dependent fact, wherein the selected at least one most closely located respondent is compensated for providing the answer to the inquiry for the location dependent fact, wherein the system determines whether there is a follow-up inquiry to the customer inquiry, and if there is a follow-up inquiry to the inquiry for the location dependent fact, the contact center routing the follow-up inquiry to the selected at least one most closely located respondent.

2. A system, as claimed in claim 1, wherein:
   said contact center includes a computer, and software means incorporated within said computer for administering screening and priority parameters of incoming customer inquiries.

3. A system, as claimed in claim 1, wherein:
   said contact center includes a computer network server, and at least one computer work station communicating with said server for managing incoming customer inquiries.

4. A system, as claimed in claim 1, wherein:
   said means for receiving includes the preconfigured categories assigned to incoming inquiries, said categories corresponding to selected respondents best qualified to answer the particular categorized inquiry.

5. A system, as claimed in claim 4, wherein:
   said preconfigured categories are a plurality of inquiries stored in a database of said contact center.

6. A system, as claimed in claim 1, wherein:
   said means for receiving includes means for screening and prioritizing by an interactive voice response unit.

7. A system, as claimed in claim 1, wherein:
   said contact center further includes means for managing incoming answers generated by the respondents, said means for managing including an interactive voice response unit.

8. A system, as claimed in claim 1, wherein:
   said plurality of mobile networked communication devices are selected from the group consisting of cellular phones, PDAs and combinations thereof.

9. A system, as claimed in claim 1, wherein:
   said means for identifying includes global positioning satellite devices carried by the respondents.

10. A system, as claimed in claim 1, wherein:
    said means for identifying includes a triangulation means incorporated at said call center for tracking locations of the respondents.

11. A method of servicing inquiries regarding a location-dependent fact, comprising:
    receiving an inquiry from a customer for the location dependent fact;
    categorizing the inquiry into one or more preconfigured categories, the preconfigured categories including location and subject matter;
    determining locations of respondents equipped with communication devices for receiving and answering inquiries;
    identifying a location that is a basis of the inquiry;
    correlating the location associated with the inquiry to the determined locations of the respondents;
    selecting at least one most closely located respondent based on the correlation; and
    communicating the inquiry to the selected respondent to answer the inquiry, wherein the selected at least one most closely located respondent is compensated for providing the answer to the inquiry for the location dependent fact, and wherein a determination is made whether there is a follow-up inquiry to the inquiry for the location dependent fact, and if there is a follow-up inquiry to the inquiry for the location dependent fact, routing the follow-up inquiry to the selected at least one most closely located respondent.

12. A method, as claimed in claim 11, further comprising:
    providing a contact center including means for screening and prioritizing customer inquires, and means for disseminating the inquiries to respondents.

13. A method, as claimed in claim 11, further comprising:
    providing means for determining the locations of the respondents.

14. A method, as claimed in claim 11, further comprising:
    equipping respondents with mobile networked communication devices communicating with a contact center that screens and prioritizes customer calls.

15. A method, as claimed in claim 11, further including the step of:
    compensating the respondent based upon factors including at least one of the accuracy of the answer and the timeliness of the answer.

16. A method, as claimed in claim 11, further including the step of:
    rating a performance of the respondent by the customer generating a communication to a contact center, the rating including preconfigured categories, said categories including at least one of an accuracy of the answer and a timeliness of the answer.

17. A method of servicing inquiries regarding a location dependent fact, said method comprising the steps of:
- providing a contact center including means for screening and prioritizing customer inquiries, means for categorizing an inquiry into one or more preconfigured categories, the preconfigured categories including location and subject matter, and disseminating the inquiries to respondents, and means for determining locations of the respondents;
- providing respondents to answer inquiries from customers;
- equipping respondents with mobile networked communication devices communicating with the contact center;
- receiving an inquiry for the location dependent fact from a customer who contacts the contact center;
- screening and prioritizing the customer inquiry;
- disseminating the inquiry from the call center to at least one respondent, the at least one respondent selected based on a correlation between a location associated with the inquiry and one or more most closely located respondents;
- receiving an indication from the selected at least one respondent; and
- answering the inquiry by the selected at least one respondent communicating an answer via the mobile networked communication device, wherein the selected at least one respondent is compensated for providing the answer to the inquiry for the location dependent fact, and determining whether there is a follow-up inquiry to the inquiry, and if there is a follow-up inquiry to the inquiry for the location dependent fact, the contact center routing the follow-up inquiry to the selected at least one respondent.

18. A method, as claimed in claim 17, further including the step of:
- compensating the selected at least one respondent based upon factors including at least one of an accuracy of the answer and a timeliness of the answer.

19. A method, as claimed in claim 17, further including the step of:
- rating a performance of the selected at least one respondent by the customer generating a communication to the contact center, the rating including the preconfigured categories, said categories including at least one of the accuracy of an answer and a timeliness of the answer.

20. A system for servicing inquiries regarding a location dependent fact, said system comprising:
- a contact center including a computer, and software means incorporated within the computer for receiving customer inquiries, and means for categorizing an inquiry into one or more preconfigured categories, the preconfigured categories location and subject matter, and disseminating the inquiries to at least a selected one of a plurality of respondents;
- communication means incorporated within said contact center for communication with customers of the system and for communicating with respondents of the system;
- a plurality of mobile networked communication devices communicating with said communication means of said contact center, said communication devices usable for receiving the inquiries and for answering the inquiries, the respondents carrying said communication devices;
- position locating means incorporated within said contact center for providing information regarding locations of the respondents; and
- means for selecting the selected at least one respondent based on a correlation between the selected at least one respondent's identified location and a location associated with an inquiry for the location dependent fact, wherein the selected at least one respondent is compensated for providing the answer to the inquiry for the location dependent fact, wherein the system further determines whether there is a follow-up inquiry to the inquiry for the location dependent fact, and if there is a follow-up inquiry to the inquiry for the location dependent fact, the contact center routing, the follow-up inquiry to the selected at least one respondent.

21. A system, as claimed in claim 20, wherein:
- said computer further includes a computer network server, and at least one computer workstation communicating with said server for managing incoming customer inquiries and for managing incoming answers generated by the respondents in response to the inquiries.

22. A system, as claimed in claim 20, wherein:
- said contact center further includes a database for maintaining information regarding qualifications and locations of respondents, and said database further including preconfigured inquiry categories that are used to screen and prioritize incoming customer inquiries.

23. A system for servicing inquiries regarding a location dependent fact, said system comprising:
- a contact center including a computer, and programming instructions incorporated within the computer for managing location specific customer inquiries and for categorizing the inquiries for the location dependent fact into one or more preconfigured categories, the preconfigured categories including location and subject matter, and disseminating the location specific inquiries to at least a selected one of a plurality of most geographically closely located respondents;
- a plurality of mobile networked communication devices communicating with said contact center, said communication devices usable for receiving the inquiries and for answering the inquiries, the respondents carrying said communication devices, wherein the respondents answering the inquiries are compensated for providing the answer to the inquiry for the location dependent fact, and wherein the system determines whether there is a follow-up inquiry to the inquiry for the location dependent fact, and if there is a follow-up inquiry to the inquiry for the location dependent fact, the contact center routing the follow-up inquiry to the selected at least one most geographically closely located respondent; and
- position locating means incorporated within said contact center for providing information regarding locations of the respondents.

24. A system, as claimed in claim 23, wherein:
- said computer further includes a computer network server, and at least one computer workstation communicating with said server for managing incoming customer inquiries and for managing incoming answers generated by the respondents in response to the inquiries.

25. A system, as claimed in claim 23, wherein:
- said contact center further includes a database for maintaining information regarding qualifications and locations of respondents, and said database further including the preconfigured inquiry categories that are used to screen and prioritize incoming customer inquiries.

* * * * *

UNITED STATES PATENT AND TRADEMARK OFFICE
CERTIFICATE OF CORRECTION

| | | |
|---|---|---|
| PATENT NO. | : 8,041,365 B1 | Page 1 of 1 |
| APPLICATION NO. | : 11/243751 | |
| DATED | : October 18, 2011 | |
| INVENTOR(S) | : Christopher R. Gentle et al. | |

It is certified that error appears in the above-identified patent and that said Letters Patent is hereby corrected as shown below:

At Column 9, line 51, after the word "categories" add the word --including-- therein.

At Column 10, line 11, please delete the "," after the word "routing".

Signed and Sealed this
Twenty-seventh Day of March, 2012

David J. Kappos
*Director of the United States Patent and Trademark Office*